United States Patent
Komatsu

(10) Patent No.: US 9,618,738 B2
(45) Date of Patent: Apr. 11, 2017

(54) ILLUMINATION DEVICE AND IMAGE DISPLAY APPARATUS

(71) Applicant: Sony Corporation, Tokyo (JP)

(72) Inventor: Yoshikazu Komatsu, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/075,428

(22) Filed: Mar. 21, 2016

(65) Prior Publication Data

US 2016/0202468 A1     Jul. 14, 2016

Related U.S. Application Data

(63) Continuation of application No. 14/695,396, filed on Apr. 24, 2015, which is a continuation of application (Continued)

(30) Foreign Application Priority Data

Jun. 16, 2010 (JP) ................. P2010-137192

(51) Int. Cl.
  *G03B 21/14*      (2006.01)
  *F21V 9/16*       (2006.01)
  (Continued)

(52) U.S. Cl.
  CPC .............. *G02B 26/008* (2013.01); *F21K 9/56* (2013.01); *F21V 13/08* (2013.01); *F21V 14/08* (2013.01);
  (Continued)

(58) Field of Classification Search
  CPC . G03B 21/204; G03B 21/2033; H04N 9/3161
  (Continued)

(56) References Cited

U.S. PATENT DOCUMENTS 7,651,243 B2    1/2010 McGuire, Jr. et al.
8,366,278 B2    2/2013 Kurosaki et al.
(Continued)

FOREIGN PATENT DOCUMENTS

CN         1837893 A         9/2006
CN     101498401 A    *    8/2009
(Continued)

OTHER PUBLICATIONS

Office Action from Japanese Application No. 2010-137192, dated Apr. 30, 2014.
(Continued)

*Primary Examiner* — William C Dowling
*Assistant Examiner* — Ryan Howard
(74) *Attorney, Agent, or Firm* — Lerner, David, Littenberg, Krumholz & Mentlik, LLP

(57) ABSTRACT

An illumination device includes: an excitation light source that emits excitation light having a first wavelength; a fluorescent substance that, when irradiated with the excitation light, emits light having a second wavelength longer than the first wavelength and transmits a part of the excitation light, and thereby multiplexes and emits the transmitted excitation light having the first wavelength and the emitted excitation light having the second wavelength; and a driving unit that moves an irradiation position of the excitation light in the fluorescent substance with the passage of time.

22 Claims, 4 Drawing Sheets

CONFIGURATION EXAMPLE OF IMAGE DISPLAY APPARATUS

Related U.S. Application Data

No. 13/156,744, filed on Jun. 9, 2011, now Pat. No. 9,052,582.

(51) Int. Cl.

| | | |
|---|---|---|
| *G02B 26/00* | (2006.01) | |
| *H04N 9/31* | (2006.01) | |
| *F21V 13/08* | (2006.01) | |
| *F21V 14/08* | (2006.01) | |
| *G02B 27/30* | (2006.01) | |
| *G03B 21/20* | (2006.01) | |
| *F21K 99/00* | (2016.01) | |
| *F21Y 101/02* | (2006.01) | |

(52) U.S. Cl.
CPC .......... *G02B 27/30* (2013.01); *G03B 21/142* (2013.01); *G03B 21/204* (2013.01); *G03B 21/208* (2013.01); *H04N 9/3117* (2013.01); *H04N 9/3158* (2013.01); *F21Y 2101/02* (2013.01); *F21Y 2101/025* (2013.01)

(58) Field of Classification Search
USPC .......... 353/84, 85, 94, 122, 30, 31; 359/885–892; 313/483, 501; 348/743; 362/84, 231; 250/484.2, 484.4
See application file for complete search history.

(56) References Cited

U.S. PATENT DOCUMENTS

| | | | |
|---|---|---|---|
| 8,434,875 B2 | 5/2013 | Masuda | |
| 8,820,940 B2* | 9/2014 | Kita | ............ G03B 21/204 353/84 |
| 9,052,582 B2 | 6/2015 | Komatsu | |
| 9,323,046 B2* | 4/2016 | Kita | ............ G03B 21/204 |
| 2005/0134812 A1 | 6/2005 | Akiyama | |
| 2006/0072339 A1 | 4/2006 | Li et al. | |
| 2006/0087847 A1 | 4/2006 | Yamanaka | |
| 2006/0139574 A1* | 6/2006 | Ralli | ............ G02B 5/305 353/20 |
| 2007/0081336 A1 | 4/2007 | Bierhuizen et al. | |
| 2009/0034284 A1 | 2/2009 | Li et al. | |
| 2009/0051884 A1 | 2/2009 | Kuan et al. | |
| 2009/0284148 A1 | 11/2009 | Iwanaga | |
| 2010/0220298 A1 | 9/2010 | Wang et al. | |
| 2010/0238412 A1 | 9/2010 | Kurosaki | |
| 2011/0116253 A1 | 5/2011 | Sugiyama | |
| 2011/0149549 A1 | 6/2011 | Miyake | |
| 2011/0187998 A1 | 8/2011 | Kimura et al. | |
| 2011/0228232 A1 | 9/2011 | Sakata et al. | |

FOREIGN PATENT DOCUMENTS

| | | |
|---|---|---|
| CN | 102193296 A | 9/2011 |
| JP | 06265894 | 9/1994 |
| JP | 2004327361 A | 11/2004 |
| JP | 2004341105 A | 12/2004 |
| JP | 2007109947 A | 4/2007 |
| JP | 2009042569 A | 2/2009 |
| JP | 2009245712 A | 10/2009 |
| JP | 2009277516 A | 11/2009 |
| JP | 2010-086815 A | 4/2010 |
| JP | 2010085740 A | 4/2010 |
| JP | 2010087324 A | 4/2010 |
| JP | 2011-197212 A | 10/2011 |
| KR | 20090119723 A | 11/2009 |
| WO | 2006133214 A2 | 12/2006 |

OTHER PUBLICATIONS

Office Action from Chinese Application No. 2011-10152826.6, dated Aug. 18, 2014.
JP Office Action for Application No. 2010137192, dated Nov. 4, 2014.
Japanese Office Action for JP Application No. 2010137192, dated Mar. 3, 2015.
Chinese Office Action for CN Application No. 201110152826.6, dated Nov. 17, 2015.
Japanese Office Action for JP Application No. 2015123652, dated Aug. 16, 2016.
Korean Office Action for Application No. 10-2011-0554984 dated Dec. 21, 2016.
Japanese Office Action for JP Application No. 2015123652, dated Feb. 14, 2017.

* cited by examiner

CONFIGURATION EXAMPLE OF IMAGE DISPLAY APPARATUS

CONFIGURATION EXAMPLE OF FLUORESCENT MEMBER

CONFIGURATION EXAMPLE OF REFLECTIVE FILM

INCIDENCE ANGLE DEPENDENCY
OF TRANSMITTANCE OF REFLECTIVE FILM

LIGHT EMITTING OPERATION OF ILLUMINATION DEVICE

SPECTRAL CHARACTERISTIC OF EMITTED LIGHT

ILLUMINATION DEVICE AND IMAGE DISPLAY APPARATUS

CROSS-REFERENCE TO RELATED APPLICATION

The present application is a continuation application of U.S. application Ser. No. 14/695,396, filed on Apr. 24, 2015, which is a continuation of U.S. application Ser. No. 13/156,744, filed on Jun. 9, 2011 (U.S. Pat. No. 9,052,582), which claims priority from Japanese Patent Application No. JP 2010-137192 filed in the Japanese Patent Office on Jun. 16, 2010, the entire content of which is incorporated herein by reference.

BACKGROUND OF THE INVENTION

Field of the Invention

The invention relates to an illumination device and an image display apparatus, and more particularly, to an illumination device used as a light source of a projection type image display apparatus such as a projector, and an image display apparatus including the illumination device.

Description of the Related Art

In recent years, in regard to watching movies at home, a presentation at a meeting, or the like, the opportunities to use a projection-type image display apparatus, such as a projector, have been increasing. In such a projector, as a light source, for example, a discharge type lamp, such as a mercury lamp, having high brightness is generally used. In addition, with the recent progresses in the development techniques for solid-state light emitting devices (for example, semiconductor lasers, light emitting diodes, or the like), there has been also suggested a projector using the solid-state light emitting device (for example, see JP-A-2009-277516).

The projector disclosed in JP-A-2009-277516 is a DLP (Digital Light Processing: registered trademark) type projector. In such a type of projector, images are displayed in full color through a time division display of approximately several thousand times per second for the different colors.

The projector disclosed in P-A-2009-277516 has a light source device that includes a light emitting diode (excitation light source) that emits blue light (excitation light), a transparent substrate provided at an emission side of the excitation light, and a motor that rotates the transparent substrate in a plane orthogonal to an emission direction of the excitation light.

In the light source device disclosed in JP-A-2009-277516, a red fluorescent layer that emits red light by the irradiation of the excitation light, a green fluorescent layer that emits green light by the irradiation of the excitation light, and a region that transmits the excitation light "as is" are formed at different regions on a transparent base. Therefore, in regard to the projector disclosed in JP-A-2009-277516, when the excitation light is emitted to the transparent base rotating with a predetermined number of rotations, the blue light (excitation light), and red light and green light excited by the excitation light are time-divisionally emitted from the light source device.

SUMMARY OF THE INVENTION

As described above, a projector not using a mercury lamp has been suggested in the related art, and in such a projector, it is possible to realize a mercury-free projector in response to recent environmental concerns. In addition, in a case where for example, a solid-state light emitting device such as a semiconductor laser and a light-emitting diode is used as a light source, it has an advantage that durability is longer and a decrease in brightness is also lower compared to the mercury lamp.

However, the technique disclosed in JP-A-2009-277516 is only applicable to a light source device (illumination device), for example, a DLP (registered trademark) type projector or the like that time-divisionally emits plural kinds of single-color light having wavelengths differing from each other. The technology may be not applicable to applications where a light source device emitting white light is necessary, like a 3 LCD (Liquid Crystal Display) type projector or the like.

Thus, it is desirable to provide a mercury-free illumination device that is also applicable to various applications such as a 3 LCD type projector and an image display apparatus having the illumination device.

An illumination device according to an embodiment of the invention includes an excitation light source, a fluorescent substance, and a driving unit. A function of each section is as follows. The excitation light source emits excitation light having a first wavelength. When being irradiated with the excitation light, the fluorescent substance emits light having a second wavelength longer than the first wavelength and transmits a part of the excitation light, and thereby multiplexes and emits the transmitted excitation light having the first wavelength and the emitted excitation light having the second wavelength. The driving unit moves an irradiation position of the excitation light in the fluorescent substance with the passage of time. In addition, the above-described "wavelength" means a wavelength including not only a single wavelength but also a predetermined wavelength band.

An image display apparatus according to another embodiment of the invention includes a light source device section and an image projection section. A function of each section is as follows. The light source device section has the same configuration as that of the illumination device of the above-described embodiment of the invention. The image projection section generates a predetermined image light by using the light emitted from the light source device section and projects the generated image light to the outside.

According to the embodiment of the invention, when being irradiated with the excitation light, the fluorescent substance emits light having a wavelength (second wavelength) longer than the wavelength (first wavelength) of the excitation light and transmits a part of the excitation light, and thereby multiplexes and emits the transmitted excitation light and light emitted from the fluorescent substance (hereinafter, referred to as "emission light"). That is, according to the embodiment of the invention, light having a wavelength band different from that of the excitation light and the emission light is emitted from the fluorescent substance. Therefore, according to the embodiment of the invention, in a case where the excitation light is set as blue light and the emission light is set as light (for example, yellow light or the like) including both red light and green light, it is possible to emit white light from the fluorescent substance.

As described above, according to the embodiment of the invention, by appropriately setting a combination of the first wavelength of the excitation light and the second wavelength of the emission light, it is possible to emit white light or the like from the fluorescent substance. Therefore, according to the embodiment of the invention, it is possible to provide a mercury-free illumination device that is also applicable to various applications such as a 3 LCD type projector and an image display apparatus having the illumination device.

DESCRIPTION OF THE PREFERRED EMBODIMENTS

Hereinafter, description will be given to an example of an illumination device and an image display apparatus having the same according to an embodiment of the invention with reference to accompanying drawings in the following order. In addition, in this embodiment, a 3 LCD type projector utilizing a transmission type LCD optical modulation device is described as an example of the image display apparatus, but the invention is not limited thereto.

1. Configuration Example of Image Display Apparatus
2. Configuration Example of Light Source Device Section (Illumination Device)
3. Configuration Example of Fluorescent Member
4. Operation Example of Light Source Device Section

[1. Configuration Example of Image Display Apparatus]

Figure 1:
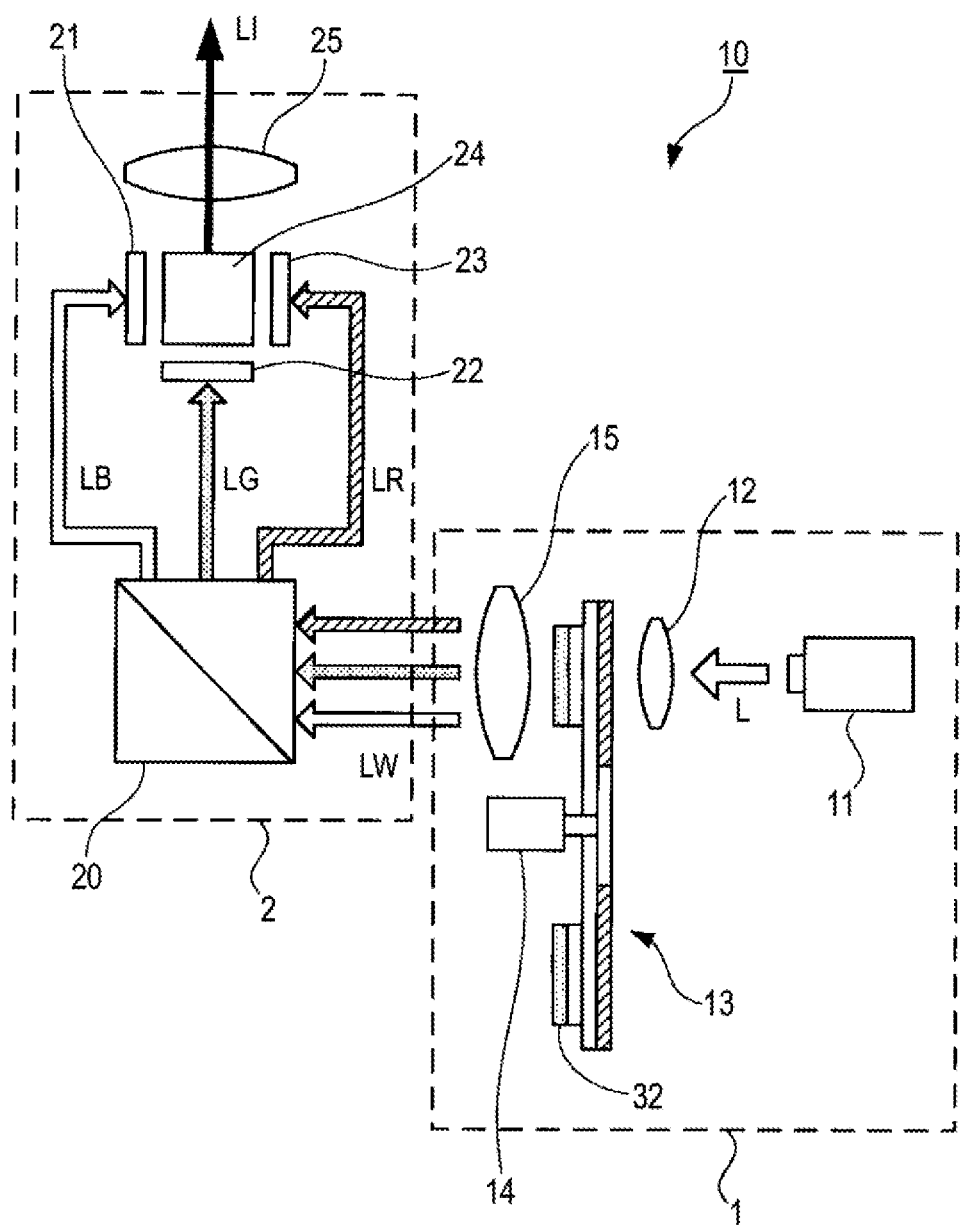
FIG. 1 is a schematic block configuration diagram illustrating an image display apparatus according to an embodiment of the invention.

FIG. 1 shows a configuration example of an image display apparatus according to an embodiment of the invention. In FIG. 1, for simplicity of explanation, only main portions that are operated when image light is projected to the outside in the image display apparatus 10 of this embodiment are mainly shown. In addition, in FIG. 1, a configuration example of a 3 LCD type projector is shown, but the invention is not limited thereto. The invention may also be applied to a 3 LCD type projector using a reflection-type LCD light modulation device.

The image display apparatus 10 includes a light source device section 1 (illumination device) and an optical engine section 2 (image projecting section). In addition, a configuration of the light source device section 1 will be described later.

The optical engine section 2 optically processes light (white light LW in this example) emitted from the light source device section 1 to generate image light LI, and magnifies and projects the image light LI to, for example, an external screen. The optical engine section 2 includes, for example, a spectral optical system 20, a 3 LCD optical modulation device (hereinafter, referred to as "a first LCD panel 21 to third LCD panel 23", respectively), a prism 24, and a projection optical system 25. In addition, the configuration of the optical engine section 2 is not limited to an example shown in FIG. 1 and may be appropriately changed, for example, according to application or the like. For example, various necessary optical devices may be appropriately disposed on an optical path between each of sections.

In addition, in the optical engine section 2 of this example, the first and third LCD panels 21 and 23 are disposed with light emitting surfaces thereof opposed to each other, and the second LCD panel 22 is disposed in a direction orthogonal to an opposing direction of the first and third LCD panels 21 and 23. The prism 24 is disposed at a region encompassed by light emitting surfaces of the first to third LCD panels 21 to 23. In addition, in this example, the projection optical system 25 is disposed at a position opposing a light emitting surface of the second LCD panel 22 with the prism 24 interposed therebetween. In addition, the spectral optical system 20 is provided at a light incident side of the first to third LCD panels 21 to 23.

The spectral optical system 20 is configured by, for example, a dichroic mirror, a reflective mirror, or the like, disperses white light LW incident from the light source device section 1 into blue light LB, green light LG, and red light LR and emits light of each wavelength component to each corresponding LCD panel. In this example, the spectral optical system 20 emits each of the dispersed blue light LB, green light LG, and red light LR to the first LCD panel 21, the second LCD panel 22, and the third LCD panel 23, respectively.

Each of the first to third LCD panels 21 to 23 is configured by a transmissive LCD panel. Each of the LCD panels transmits or shields (modulates) the incident light with a liquid crystal cell unit by changing an arrangement of liquid crystal molecules enclosed in a liquid crystal cell (not shown) on the basis of a driving signal supplied from a panel drive section (not shown). Therefore, each of the LCD panels emits light (modulated light) to the prism 24 with a predetermined wavelength that is modulated.

The prism 24 multiplexes the modulated light of each wavelength component incident from the first to third LCD panels 21 to 23, respectively, and emits the multiplexed light, that is, image light LI to the projection optical system 25.

The projection optical system 25 magnifies and projects the image light incident from the prism 24 onto a display surface of, for example, an external screen or the like.

[2. Configuration Example of Light Source Device Section 1]

Next, an internal configuration of the light source device section 1 of this embodiment will be described with reference to FIG. 1.

The light source device section 1 includes an excitation light source 11, a first condensing optical system 12 (first optical system), a fluorescent member 13, a motor 14 (driving unit), and a second condensing optical system 15 (second optical system). In the light source device section 1 of this embodiment, the first condensing optical system 12, the fluorescent member 13, and the second condensing optical system 15 are disposed in this order from an emission opening of the excitation light L of the excitation light source 11. At this time, the first condensing optical system 12, a layer-shaped fluorescent substance 32 (hereinafter, referred to as "fluorescent layer 32") that is described later, in the fluorescent member 13, and the second condensing optical system 15 are disposed on an optical path of the excitation light L.

The excitation light source 11 is configured by a solid-state light emitting device that emits light of a predetermined wavelength (a first wavelength). In this example, as the excitation light source 11, a blue laser emitting blue light with a wavelength of 445 nm is used. In addition, in this embodiment, a wavelength of the excitation light L incident to the fluorescent layer 32 is set to a wavelength shorter than that of light emitted from the fluorescent layer 32 that is described later, in the fluorescent member 13.

In addition, in a case where as the excitation light source 11, a blue laser is used, it may be configured to obtain excitation light L with a predetermined output by one blue laser, and it may be configured to multiplex emitted light from each of plural blue lasers and obtain excitation light L with a predetermined output. In addition, a wavelength of the blue light (excitation light L) is not limited to 445 nm, and it is possible to use any wavelength as long as the wavelength is within a wavelength band of light called blue light.

The first condensing optical system 12 condenses the excitation light L emitted from the excitation light source 11 and emits the condensed excitation light L (hereinafter, referred to as "condensed light") to the fluorescent member 13. At this time, for example, parameters such as lens configuration, focal point distance, and alignment position of the first condensing optical system 12 are designed so that the condensed light is incident to the fluorescent member 13 with a predetermined incidence angle θ. In addition, the incidence angle θ of the condensed light is appropriately set corresponding to a transmitting characteristic (incidence angle dependency of a transmittance) of a reflective film 31, which is described later, in the fluorescent member 13.

In addition, when the spot diameter of the excitation light L in the first condensing optical system 12 is focused, it is possible to irradiate highly dense excitation light L to the fluorescent member 13. Therefore, when the spot of the excitation light L is excessively focused, excitation light L having a light amount larger than that necessary for allowing fluorescent atoms in an irradiation region to emit light is irradiated. In this case, in regard to the irradiation region, since the light quantity not contributing to the light emission of the fluorescent atoms is increased, a ratio of the light emission amount to the light amount of the incident excitation light L is decreased, whereby a light emission efficiency of the fluorescent layer 32 is decreased. Therefore, in this embodiment, the configuration of the first condensing optical system 12 is designed so that the spot diameter of the condensed light becomes a diameter not decreasing the light emission efficiency.

Conversely, when the spot diameter of the condensed light excessively broadens, the broadening of the emission light from the fluorescent member 13 is increased. In this case, the spot diameter of the condensed light may be controlled so as not to broaden by the first condensing optical system 12, or a configuration where the broadened emission light is converted into parallel light having a predetermined diameter by the second condensing optical system 15 may be considered.

The fluorescent member 13 emits light with a predetermined wavelength band (second wavelength) by the excitation light L (blue light) incident thereto via the first condensing optical system 12 and transmits a part of the excitation light L. In this example, since the light incident to the optical engine section 2 is set as white light LW, the fluorescent member 13 emits, by the excitation light L, light with a wavelength band (approximately 480 to 680 nm) including green light and red light. In this embodiment, the emission light with a wavelength band including green light and red light and a part of the excitation light L (blue light) that is transmitted through the fluorescent member 13 are multiplexed and white light LW is generated. In addition, detailed configuration of the fluorescent member 13 will be described later.

The motor 14 rotatably drives the fluorescent member 13 with a predetermined number of rotations. At this time, the motor 14 drives the fluorescent member 13 so that the fluorescent member 13 rotates in a direction along a plane (an irradiation plane of the excitation light L of the fluorescent layer 32 described later) orthogonal to an irradiation direction of the excitation light L.

A rotational shaft 14a of the motor 14 is attached to the center of a transparent substrate 30, which is described later, of the fluorescent member 13, and the transparent substrate is fixed to the rotational shaft 14a by a fixing hub 14b. The fluorescent member 13 is rotatably driven by the motor 14, such that the irradiation position of the excitation light L in the fluorescent member 13 is moved with the passage of time at a speed corresponding to the number of rotations in a plane orthogonal to the irradiation direction of the excitation light L.

As described above, the fluorescent member 13 is rotatably driven by the motor 14 and the irradiation position of the excitation light in the fluorescent member 13 is moved with the passage of time, such that it is possible to suppress an increase in the temperature at the irradiation position and it is possible to prevent the light emission efficiency of the fluorescent layer 32 from being decreased. In addition, it takes some time (for example, several nsec) for fluorescent atoms to absorb the excitation light L and to emit light, and even when the next excitation light L is emitted to the fluorescent atoms for the excitation period, the atoms do not emit light. However, according to this embodiment, the irradiation position of the excitation light L in the fluorescent member 13 is moved with the passage of time, such that the fluorescent atoms not excited are sequentially disposed at the irradiation position of the excitation light L and thereby it is possible to allow the fluorescent layer 32 to efficiently emit light.

In addition, in this embodiment, an example where the fluorescent member 13 is rotatably driven by the motor 14 is illustrated. However, the invention is not limited thereto and may be configured in any manner as long as the irradiation position of the excitation light L in the fluorescent member 13 is moved with the passage of time. For example, the irradiation position of the excitation light L may be moved with the passage of time by making the fluorescent member 13 lineally reciprocate in a predetermined direction in a plane (in an irradiation plane of the excitation light L in a fluorescent layer 32 described later) orthogonal to the irradiation direction of the excitation light L. In addition, the irradiation position of the excitation light L may be moved with the passage of time by fixing the fluorescent member 13 and by relatively moving the excitation light source 11 with respect to the fluorescent member 13.

The second condensing optical system 15 condenses light (white light LW) emitted from the fluorescent member 13 and converts it into parallel light. Then, the second condensing optical system 15 guides the parallel light to the spectral optical system 20 of the optical engine section 2. In addition, the second condensing optical system 15 may be configured by a single collimator lens or may be configured to convert incident light into parallel light by using plural lenses. In addition, since the emission light from the fluorescent member 13 is light that expands in a lambertian (uniform diffusion) shape, it is preferable that the distance between the second condensing optical system 15 and the fluorescent member 13 (more specifically fluorescent layer 32 described later) is as short as possible.

In addition, in this embodiment, an example where the first condensing optical system 12 and the second condensing optical system 15 are provided in the light source device section 1 is described, but the invention is not limited thereto. For example, in a case where the light source device section 1 of this embodiment is applied to an application where even when the output of the emitted light from the light source device 1 is small, this does not cause a problem, and either the first condensing optical system 12 or the second condensing optical system 15 or both of them may be not provided.

[3. Configuration Example of Fluorescent Member]

Next, a more detailed configuration of the fluorescent member 13 will be described with reference to FIGS. 2A to 2C. In addition, FIG. 2A shows a front view of the fluorescent member 13 seen from the second condensing optical system 15 side, FIG. 2B shows a cross sectional view taken along a line A-A of FIG. 2A, and FIG. 2C shows a front view of the fluorescent member 13 seen from the first condensing optical system 12 side.

The fluorescent member 13 includes a disk-shaped transparent substrate 30, a reflective film 31 and a fluorescent layer 32 (fluorescent substance) formed on one surface of the transparent substrate 30, and a reflection prevention film 33 formed on the other surface of the transparent substrate 30.

The transparent substrate 30 is formed from a transparent material such as glass and transparent resin. In addition, a size such as the thickness of the transparent substrate 30 is appropriately set in consideration of, for example, the necessary transmittance, strength, or the like.

Figure 2A:
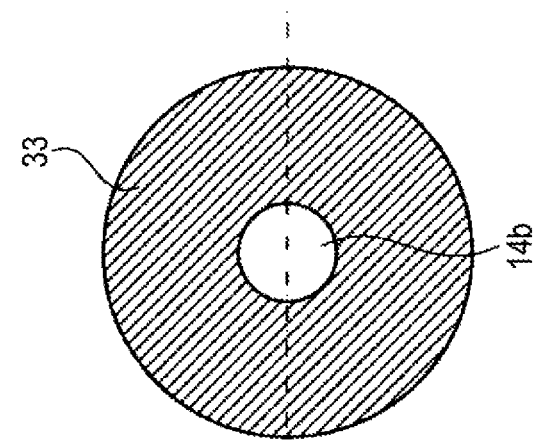
FIGS. 2A to 2C are schematic configuration diagrams illustrating a fluorescent member used for a light source device section (illumination device)
Figure 2B:
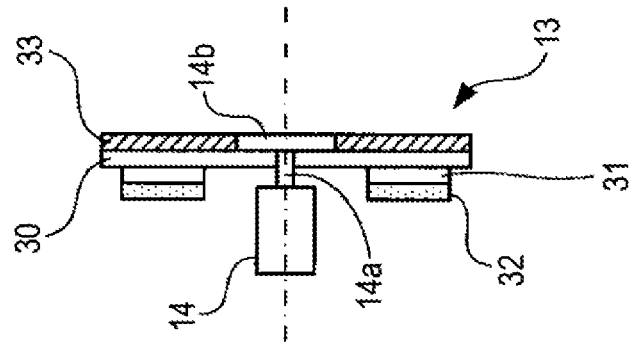
Figure 2C:
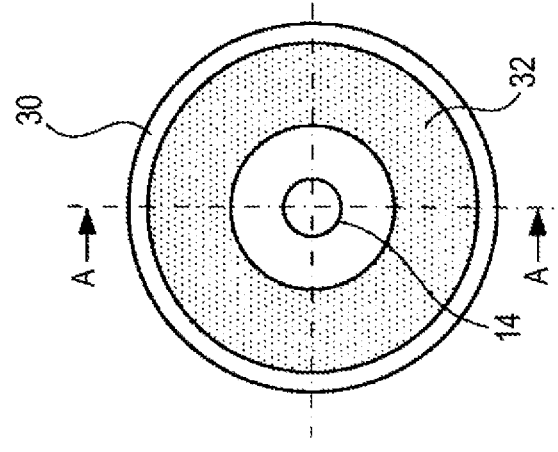

The reflective film 31, as shown in FIG. 2A, is formed on one surface of the transparent substrate 30 with a doughnut shape. The doughnut-shaped reflective film 31 is disposed on the transparent substrate 30 in a manner such that the reflective film 31 and the transparent substrate 30 are concentric to each other. In addition, a width of the reflective film 31 in the radial direction thereof is set to a value larger than the spot size of the excitation light L (condensed light) condensed by the first condensing optical system 12.

In addition, the reflective film 31 not only reflects the light (emission light) excited at the fluorescent layer 32 to the second condensing optical system 15 side, but also reflects the excitation light L (blue light) scattered in and reflected from the fluorescent layer 32 to the second condensing optical system 15 side.

Figure 3:
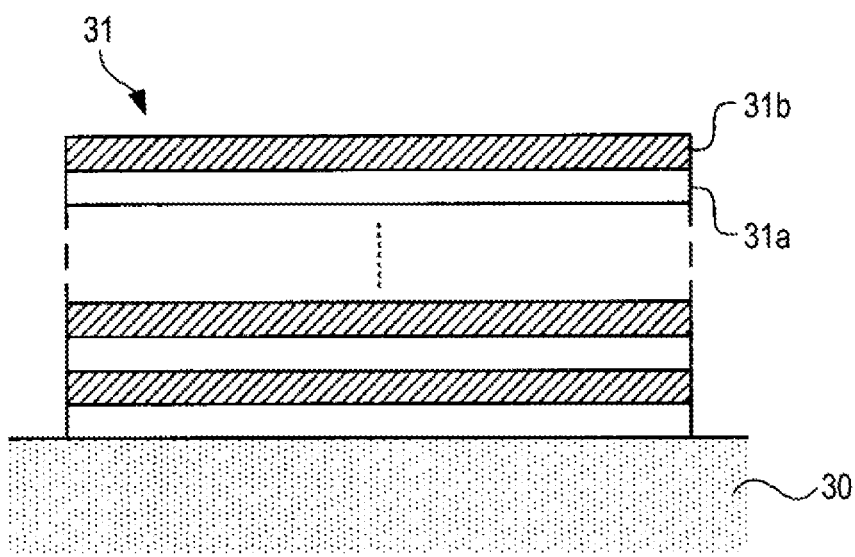
FIG. 3 is a view illustrating a configuration example of a reflective film used in a fluorescent member

Here, FIG. 3 shows one configuration example of the reflective film 31. The reflective film 31 is formed by alternately laminating a first dielectric layer 31a formed from, for example, an SiO2 layer, a MgF2 layer, or the like and a second dielectric layer 31b formed from, for example, a TiO2 layer, a Ta2O3 layer, or the like on the transparent substrate 30. Specifically, the reflective film 31 may be configured by a dichroic mirror (dichroic film). In addition, the lamination count of each of the first dielectric layer 31a and the second dielectric layer 31b may generally be several layers to several tens of layers. In addition, the first dielectric layer 31a and the second dielectric layer 31b are formed by, for example, a vapor-deposition method, a sputtering method, or the like.

Figure 4:
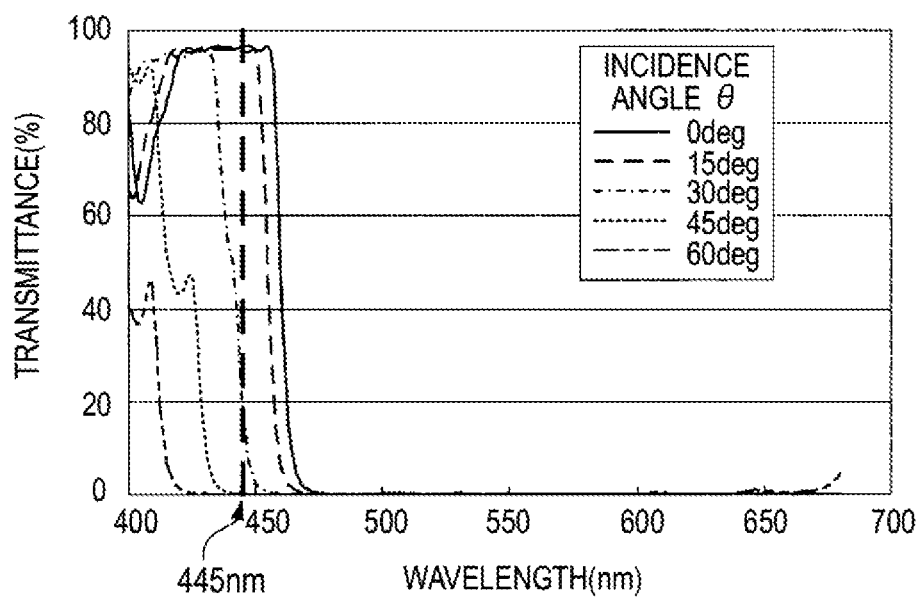
FIG. 4 is a view illustrating a relationship between a transmittance of the reflective film used in the fluorescent member and a light incidence angle.

In a case where the reflective film 31 is configured by a dichroic mirror as shown in FIG. 3, by the adjustment of a lamination count of each dielectric layer, a thickness of each dielectric layer, a forming material of each dielectric layer, or the like, it is possible to easily set an incidence angle dependency of a transmittance (reflectance) of light incident to the reflective film 31. FIG. 4 shows an example of the incidence angle dependency of an optical transmittance of the reflective film 31 used in this embodiment. In FIG. 4, a horizontal axis represents a wavelength of incident light and a vertical axis represents a transmittance.

In the example shown in FIG. 4, the reflective film 31 is designed to selectively reflect light with a wavelength band (a wavelength band of approximately 480 to 680 nm) including red light and green light regardless of incidence angles θ thereof. Therefore, with respect to light (emission light from the fluorescent layer 32) with a wavelength band including red light and green light, the transmittance becomes approximately zero regardless of the incidence angle θ of the light. That is, light with a wavelength band including red light and green light is totally reflected from the reflective film 31, regardless of the incidence angle θ thereof.

On the other hand, with respect to blue light (excitation light L) with a wavelength of 445 nm, the reflective film 31 is designed such that when the incidence angle θ thereof is approximately 20° or less, it transmits the blue light, and when the incidence angle θ thereof is larger than approximately 20°, it reflects the blue light. Therefore, as shown in FIG. 4, at a wavelength of 445 nm (thick broken line) of the blue light (excitation light L), when the incidence θ of the light is 0° (solid line) and 15° (broken line), the transmittance becomes large. In addition, when the incidence θ of the blue light is 30° (one dotted line), 45° (dotted line), and 60° (two dotted line), the transmittance at a wavelength of 445 nm becomes small. That is, in the excitation light L that is scattered in and reflected from the fluorescent layer 32, an excitation light component incident to the reflective film 31 at an incidence angle θ larger than approximately 20° is reflected from the reflective film 31 in a direction toward the second condensing optical system 15.

In addition, as described above, the configuration of the first condensing optical system 12 is designed according to the incidence angle dependency of transmittance of the reflective film 31. For example, in a case where the reflective film 31 has the incidence angle dependency of transmittance shown in FIG. 4, so as not to decrease the usage efficiency of the excitation light L, the first condensing optical system 12 is designed such that the incidence angle θ of the condensed excitation light L becomes 20° or less.

In addition, the fluorescent layer 32 is a layer-shaped fluorescent substance that emits light with a predetermined wavelength band when the excitation light L is emitted thereto. In this embodiment, transmitted light of the excitation light L and emission light in the fluorescent layer 32 are multiplexed and white light LW is generated, such that as the fluorescent layer 32, for example, a YAG (Yttrium Aluminum Garnet)-based fluorescent material or the like is used. In this case, when blue excitation light L is incident to the fluorescent layer 32, the fluorescent layer 32 emits light with a wavelength band of 480 to 680 nm (yellow light). In addition, the fluorescent layer 32 may be configured by any material as long as a film can emit light with a wavelength band including red light and green light, but it is preferable that the YAG-based fluorescent material is used, from the view point of light-emitting efficiency and heat resistance.

The fluorescent layer 32 is formed by applying a predetermined fluorescent agent obtained by mixing a fluorescent material and a binder on the reflective film 31. In the example shown in FIGS. 2A to 2C, the fluorescent layer is formed so as to cover the entire surface of the reflective film 31, such that the surface shape of the fluorescent layer 32 become a doughnut shape. In addition, the fluorescent layer 32 may be formed only at a region where the excitation light L is emitted thereto, such that the shape of the fluorescent layer 32 is not limited to the example shown in FIGS. 2A to 2C, and for example, a width of the fluorescent layer 32 in a radial direction may be narrower than that of the reflective film 31.

In addition, in regard to the fluorescent layer 32, a light emission amount, and a transmission amount of the excitation light L may be adjusted by a thickness of the fluorescent layer 32, a density (contained amount) of a fluorescent substance, or the like. Therefore, in this embodiment, the thickness of the fluorescent layer 32, the density of the fluorescent substance, or the like is adjusted so that the emitted light from the light source device section 1 becomes white light.

The reflection prevention film 33 is provided on a surface of the transparent substrate 30 at an incidence side of the excitation light L and prevents the reflection of the excitation light L, which is generated at the incidence plane of the condensed light when the condensed light of the excitation light L is incident to the fluorescent member 13. Therefore, the usage efficiency of the excitation light L may be improved.

In addition, in this embodiment, an example where the reflective film 31 and the reflection prevention film 33 are provided in the fluorescent member 13 is described, but the invention is not limited thereto. For example, in a case where the light source device section 1 of this embodiment is applied to an application where even when the output of the emitted light is small, this does not cause a problem, either the reflective film 31 or the reflection prevention film 33 or both of them may be not provided. In addition, in the fluorescent member 13 of the above-described embodiment, an example where the layer-shaped fluorescent substance (fluorescent layer 32) is formed on the substrate 30 via the reflective film 31 is described, but the invention is not limited thereto. For example, in a case where the fluorescent substance is configured by a plate-shaped member having sufficient strength, the transparent substrate 30 may not be provided.

[4. Operation Example of Light Source Device Section]

Figure 5:
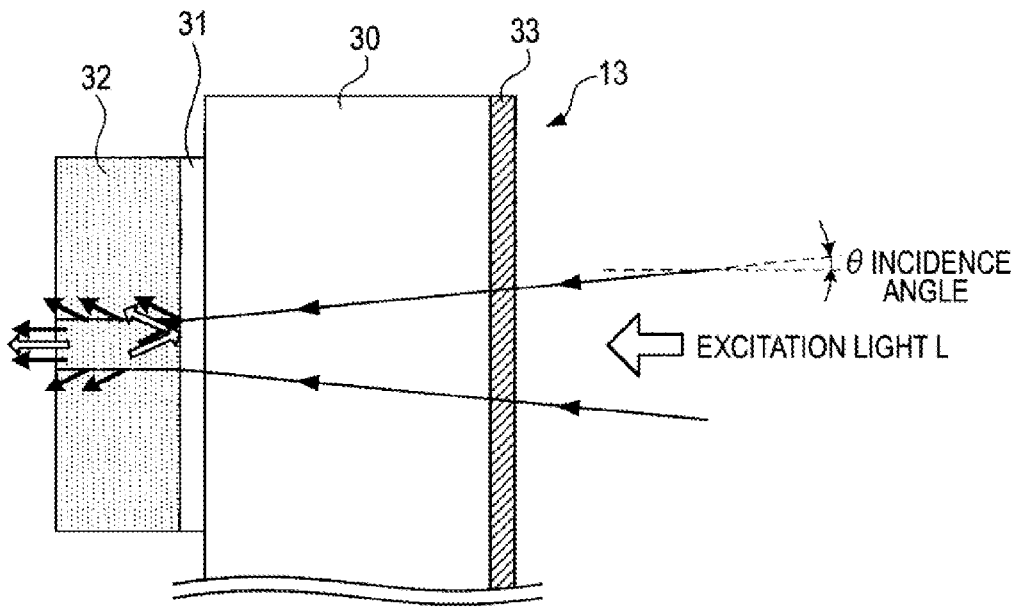
FIG. 5 is a view illustrating a light emission state in a fluorescent substance and a light reflection state in a surface of the reflective film.

FIG. 5 shows an operational state of the light source device section 1 of this embodiment. In the light source device section 1 of this embodiment, the excitation light L (blue light in this example) emitted from the excitation light source 11 is first condensed at the first condensing optical system 12. Subsequently, the condensed light (the condensed excitation light L) is incident to the fluorescent member 13 from the reflection prevention film 33 side of the fluorescent member 13 at a predetermined incidence angle θ. In addition, in this embodiment, the fluorescent member 13 is irradiated with the condensed light in a state where the fluorescent member 13 is rotating with a predetermined number of rotations by the motor 14.

The condensed light incident to the fluorescent member 13 is transmitted through the reflection prevention film 33, the transparent substrate 30, and the reflective film 31, and is incident to the fluorescent layer 32. In addition, as described above, since the reflective film 31 is designed to transmit the excitation light L with a predetermined incidence angle θ or less, the condensed light incident to the fluorescent member 13 is not reflected from the reflective film 31.

Subsequently, when the condensed light (excitation light L) is incident to the fluorescent layer 32, a part of the condensed light (excitation light L) is transmitted through the fluorescent layer 32 and the remainder thereof is mainly absorbed by the fluorescent layer 32. Due to the absorbed excitation light L, the fluorescent layer 32 is excited, and light (in this example, yellow light including red light and green light) with a predetermined wavelength band is emitted from the fluorescent layer 32. As a result, a transmitted component of the excitation light L and the emission light from the fluorescent layer 32 are multiplexed and white light is emitted from the fluorescent layer 32.

In addition, at this time, the emission light of the fluorescent layer 32 is not only emitted in a direction toward the second condensing optical system 15, but is also emitted in a direction toward the transparent substrate 30. In addition, a part of the excitation light L incident to the fluorescent layer 32 is also scattered and reflected inside the fluorescent layer 32 in a direction toward the transparent substrate 30. However, in the fluorescent member 13 of this embodiment, as described above, since the reflective film 31 is provided between the transparent substrate 30 and the fluorescent layer 32, the emission light and the excitation light component emitted in a direction toward the transparent substrate 30 is reflected by the reflective film 31 in a direction toward the second condensing optical system 15. At this time, the excitation light component reflected from the reflective film 31 is absorbed in the fluorescent layer 32 and further allows the fluorescent layer 32 to emit light. Therefore, like this embodiment, in a case where the reflective film 31 is provided between the transparent substrate 30 and the fluorescent layer 32, it is possible to increase the usage efficiency of the excitation light L and it is possible to increase the light amount of the emission light.

In addition, in practice, the inventor of the invention set parameters of each section of the light source device section 1 as follows, and examined a spectral characteristic of the emitted light from the light source device section 1.

Wavelength of the excitation light source 11 (blue laser): 445 nm

Condensing diameter of excitation light L: 1 mm

Incidence angle θ of excitation light L: 20° or less

Number of rotations of the fluorescent member 13: 3000 rpm

Distance between the second condensing optical system 15 and the fluorescent layer 32: 1 mm or less Forming material of the transparent substrate 30: Glass Diameter of the transparent substrate 30: 30 mm Transmission characteristics of the reflective film 31: Characteristic shown in FIG. 4

Forming material of the fluorescent layer 32: A YAG-based fluorescent substance

Thickness of the fluorescent layer 32: 50 μm

Width of the fluorescent layer 32: 5 mm

Figure 6:
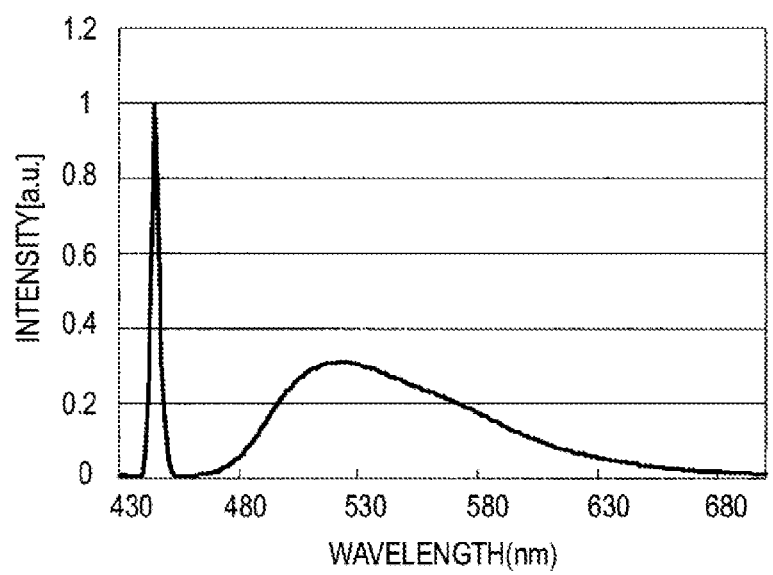
FIG. 6 is a view illustrating a spectral characteristic of emitted light of the light source device section (illumination device) according to the embodiment of the invention.

FIG. 6 shows a spectral characteristic of an emitted light from the light source device section 1, which is obtained under the above-described conditions. In addition, in the characteristic shown in FIG. 6, a horizontal axis represents a wavelength, and a vertical axis represents intensity (any unit) of the emitted light. As can be seen from FIG. 6, under the condition, it can be seen that a light component (blue light component) near a wavelength of 445 nm and a light component with a wavelength ranging from approximately 480 to 680 nm, that is, a light component including a red light component and a green light component are included in the emitted light. From this, it can also be seen that white light LW is emitted from the light source device section 1 of this embodiment.

As described above, it is possible to emit the white light from the light source device section 1 by using a solid-state light emitting device. Therefore, this embodiment may be applied for an application where a light source device emitting white light is necessary, for example, like in a 3 LCD type projector. That is, in this embodiment, it is possible to provide a mercury-free light source device section (illumination device), which can be applied for various applications, and an image display apparatus 10 having the same.

In the light source device section 1 of this embodiment, it is not necessary to use a mercury lamp, such that it is possible to cope with a recent environmental problem. In addition, according to this embodiment, it is possible to provide a light source device section 1 of which durability is longer and decrease in brightness is also lower compared to the mercury lamp, and an image display apparatus 10. In addition, like in this embodiment, when a solid-state light emitting device is used in the excitation light source 11, a lighting time may be shortened compared to the mercury lamp.

In addition, in a case where a semiconductor laser is used as the excitation light source 11 like in the light source device section 1 of this embodiment, light with a sufficiently high brightness may be emitted compared to a solid-state light source such as an LED (Light Emitting Diode) and thereby it is possible to realize a high brightness light source. In addition, like in this embodiment, a configuration where the fluorescent layer 32 is made to emit light by using a blue light laser to generate white light LW is cheaper than a configuration where solid-state light sources for red light, green light and blue light are separately prepared to generate white light.

In addition, in this embodiment, a 3 LCD type projector is described as an example of the light source device section 1 (illumination device), but the invention is not limited thereto. The invention may be applied to any image display apparatus where white light is necessary and the same effect may be obtained.

In the embodiment, there is described an example where the emitted light of the light source device section 1 (illumination device) is set as white light, but the invention is not limited thereto. For example, as the emitted light, blue light may be used for an application where cyan light (or magenta light) is necessary as the excitation light L, or the fluorescent layer 32 may be formed by a fluorescent material that emits only green light (or red light). That is, according to a necessary wavelength (color) of the emitted light, a combination of the wavelength of the excitation light L and the material for forming the fluorescent layer 32 may be appropriately selected.

It should be understood by those skilled in the art that various modifications, combinations, sub-combinations and alterations may occur depending on design requirements and other factors insofar as they are within the scope of the appended claims or the equivalents thereof.

What is claimed is:

1. A light source device comprising:
   an excitation light source configured to emit excitation light having a first wavelength range;
   a single rotatable fluorescent portion configured to include:
      a fluorescent substance that is formed along a circumference of a substrate and which, responsive to being irradiated with the excitation light, emits emission light having a second wavelength range which is different from the first wavelength range, and
      a reflective portion that reflects the emission light emitted from the fluorescent substance;
   an optical collimator configured to convert reflection light reflected by the reflective portion into substantially parallel light; and
   a reflection preventing portion that is provided at an incidence side of the excitation light of the fluorescent substance and prevents the excitation light from being reflected.

2. The light source device according to claim 1, wherein the reflection preventing portion is a reflection preventing film.

3. The light source device according to claim 1, further comprising:
   a driving unit configured to move an irradiation position of the fluorescent substance by the excitation light with passage of time.

4. The light source device according to claim 3, wherein the driving unit is configured to move the fluorescent substance to a predetermined direction in an irradiation surface of the excitation light of the fluorescent substance.

5. The light source device according to claim 1, further comprising:
   wherein the reflective portion includes a reflective film that is provided at an incidence side of the excitation light of the fluorescent substance.

6. The light source device according to claim 5, wherein the reflective film is a film that transmits the excitation light with an incidence angle of a predetermined angle or less and that reflects the excitation light with an incidence angle of more than the predetermined angle.

7. The light source device according to claim 6, further comprising:
   an optical system configured to condense the excitation light such that the incidence angle of the excitation light to the reflective film becomes the predetermined angle or less, in which the optical system is provided on an optical path between the reflective film and the excitation light source.

8. The light source device according to claim 6, wherein the predetermined angle is approximately 20 degrees or less.

9. The light source device according to claim 1, wherein the first wavelength range is in at least a blue spectrum and the second wavelength range is in a red spectrum and a green spectrum.

10. A light source device comprising:
    an excitation light source configured to emit excitation light having a first wavelength range;
    a single rotatable fluorescent portion configured to include:
       a fluorescent substance that is formed along a circumference of a substrate and which, responsive to being irradiated with the excitation light, emits emission light having a second wavelength range which is different from the first wavelength range, and
       a reflective portion that reflects the emission light emitted from the fluorescent substance; and
    an optical collimator configured to convert reflection light reflected by the reflective portion into substantially parallel light,
    wherein the fluorescent substance is formed continuously along an entirety of the circumference of the substrate.

11. The light source device according to claim 10, wherein the substrate and the reflective portion are integrally formed together.

12. An image display apparatus, comprising:
    a light source device including:

an excitation light source configured to emit excitation light having a first wavelength range;

a single rotatable fluorescent portion configured to include:

a fluorescent substance that is formed along a circumference of a substrate and which, responsive to being irradiated with the excitation light, emits emission light having a second wavelength range which is different from the first wavelength range, a reflective portion that reflects the emission light emitted from the fluorescent substance, and an optical collimator configured to convert reflection light reflected by the reflective portion into substantially parallel light; and an image projection device configured to generate image light by using light emitted from the light source device and project the generated image light to the outside, wherein the light source device includes a reflection preventing portion that is provided at an incidence side of the excitation light of the fluorescent substance and prevents the excitation light from being reflected.

13. The apparatus according to claim 12, wherein the reflection preventing portion is a reflection preventing film.

14. The apparatus according to claim 12, wherein the light source device includes a driving unit configured to move an irradiation position of the fluorescent substance by the excitation light with passage of time.

15. The apparatus according to claim 14, wherein the driving unit is configured to move the fluorescent substance to a predetermined direction in an irradiation surface of the excitation light of the fluorescent substance.

16. The apparatus according to claim 12, wherein the reflective portion includes a reflective film that is provided at an incidence side of the excitation light of the fluorescent substance.

17. The apparatus according to claim 16, wherein the reflective film is a film that transmits the excitation light with an incidence angle of a predetermined angle or less and that reflects the excitation light with an incidence angle of more than the predetermined angle.

18. The apparatus according to claim 17, wherein the light source device includes an optical system configured to condense the excitation light such that the incidence angle of the excitation light to the reflective film becomes the predetermined angle or less, in which the optical system is provided on an optical path between the reflective film and the excitation light source.

19. The apparatus according to claim 17, wherein the predetermined angle is approximately 20 degrees or less.

20. The apparatus according to claim 12, wherein the first wavelength range is in at least a blue spectrum and the second wavelength range is in a red spectrum and a green spectrum.

21. An image display apparatus, comprising:

a light source device including:

an excitation light source configured to emit excitation light having a first wavelength range;

a single rotatable fluorescent portion configured to include:

a fluorescent substance that is formed along a circumference of a substrate and which, responsive to being irradiated with the excitation light, emits emission light having a second wavelength range which is different from the first wavelength range, a reflective portion that reflects the emission light emitted from the fluorescent substance, and an optical collimator configured to convert reflection light reflected by the reflective portion into substantially parallel light; and an image projection device configured to generate image light by using light emitted from the light source device and project the generated image light to the outside, wherein the fluorescent substance is formed continuously along an entirety of the circumference of the substrate.

22. The image display apparatus according to claim 21, wherein the substrate and the reflective portion are integrally formed together.

* * * * *